United States Patent
Chen et al.

(10) Patent No.: US 9,511,818 B2
(45) Date of Patent: Dec. 6, 2016

(54) TORQUE SENSOR AND ELECTRIC BICYCLE USING SAME

(71) Applicant: HON HAI PRECISION INDUSTRY CO., LTD., New Taipei (TW)

(72) Inventors: Yen-Chi Chen, New Taipei (TW);
Chang-Yuan Shih, New Taipei (TW);
Shih-Hsin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/810,175

(22) Filed: Jul. 27, 2015

(65) Prior Publication Data

US 2016/0280322 A1 Sep. 29, 2016

(30) Foreign Application Priority Data

Mar. 26, 2015 (TW) ................. 104109850

(51) Int. Cl.
| | |
|---|---|
| *G01L 3/02* | (2006.01) |
| *B62M 6/50* | (2010.01) |
| *G01L 3/10* | (2006.01) |
| *G01L 5/28* | (2006.01) |
| *G01P 15/00* | (2006.01) |
| *G01B 21/16* | (2006.01) |

(52) U.S. Cl.
CPC ............. *B62M 6/50* (2013.01); *G01L 3/108* (2013.01); *G01B 21/16* (2013.01); *G01L 5/282* (2013.01); *G01P 15/00* (2013.01)

(58) Field of Classification Search
CPC ........ G01B 21/16; G01L 5/282; G01P 15/00
USPC ........................... 73/862.08, 862.193
See application file for complete search history.

(56) References Cited

U.S. PATENT DOCUMENTS

| | | | | |
|---|---|---|---|---|
| 4,966,380 | A * | 10/1990 | Mercat .................. | G01L 3/1464 280/259 |
| 9,221,516 | B1* | 12/2015 | Song ...................... | B62M 11/16 |
| 9,354,129 | B2* | 5/2016 | Boudet ................. | G01L 3/1478 |
| 2011/0133542 | A1* | 6/2011 | Ratti ....................... | B60B 1/003 301/6.5 |

FOREIGN PATENT DOCUMENTS

| | | |
|---|---|---|
| CN | 1399121 A | 2/2003 |
| CN | 203581299 U | 5/2014 |
| TW | 201410531 A | 3/2014 |

* cited by examiner

*Primary Examiner* — Max Noori
(74) *Attorney, Agent, or Firm* — Zhigang Ma

(57) ABSTRACT

A torque sensor for electrically assisting a vehicle with pedals includes a housing, a rotating member, an actuator, and an resistor. The housing defines a receiving chamber and is configured to be coupled to the driving member. The rotating member is rotatably mounted in the receiving chamber and configured to rotate under an external force. The resistor is received in the receiving chamber and the actuator slides along the electrical resistance and compresses a spring as a rider applies force to the pedals. The variable resistor is coupled to a controlling module which governs the assisting power. The disclosure also includes an electric bicycle using the torque sensor.

16 Claims, 4 Drawing Sheets

TORQUE SENSOR AND ELECTRIC BICYCLE USING SAME

FIELD

The subject matter herein generally relates to control of electrical power assistance.

BACKGROUND

An assisting motor is used in a vehicle, such as a bicycle, which can augment the manual power applied to the pedals. These types of vehicles generally use torque sensor so as to sense an amount of pedal input force applied by a vehicle rider or operator. Then, an assisting motor is provided which adds to the manual force in some ratio based upon the amount of pedal force applied.

BRIEF DESCRIPTION OF THE DRAWINGS

Implementations of the present technology will now be described, by way of example only, with reference to the attached figures.

DETAILED DESCRIPTION

Figure 1:
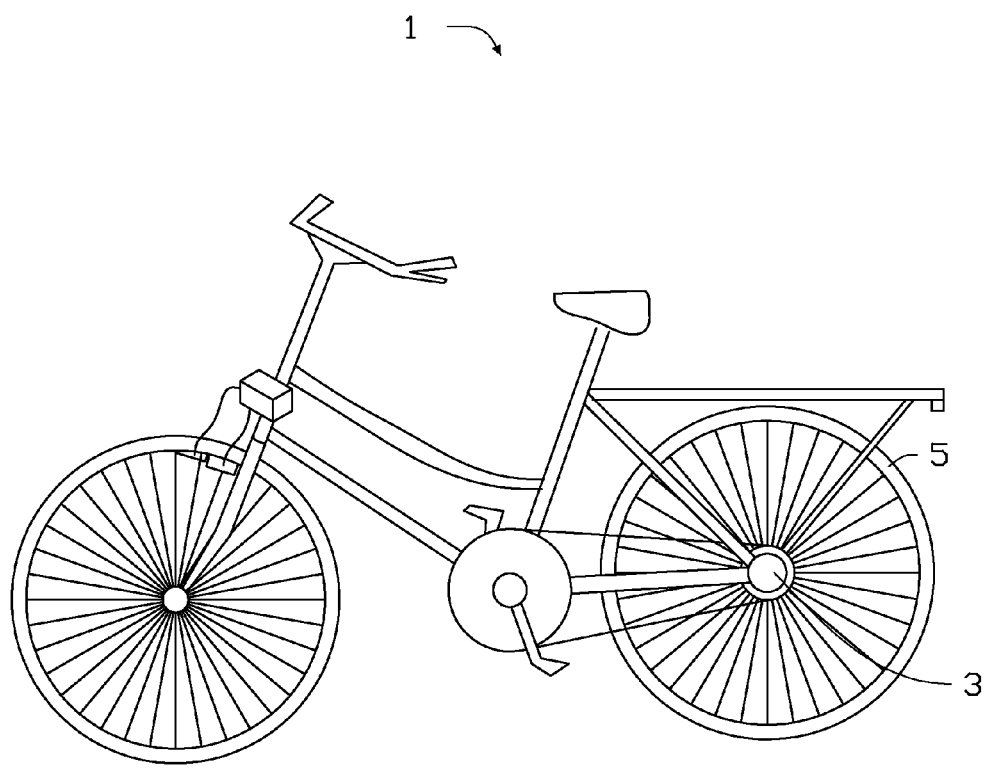
FIG. 1 is a diagrammatic view of an embodiment of an electric bicycle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a torque sensor. The torque sensor can include a housing, a rotating member, an actuator, and a resistor. The housing can define a receiving chamber and be configured to be coupled to the driving member. The rotating member can be rotatably mounted in the receiving chamber. The resistor can be received in the receiving chamber and be in slidable contact with the actuator. The resistor can be configured to be electrically coupled to a controlling module. The actuator can be made to slide by the rotating member along the resistor, thus adjusting a resistance value of the controlling module. The rotating member is capable of being rotated under an external force, thereby enabling the controlling module to generate a signal for controlling a torque output of the driving member.

The present disclosure is further described in relation to an electric bicycle. The electric bicycle can include a freewheel, a rear wheel, a driving member, a controlling module, and a torque sensor. The driving member can be mounted in a central hole of the rear wheel. The controlling module can be electrically coupled to the driving member. The torque sensor can be coupled between the driving member and the freewheel. The torque sensor can include a housing, a rotating member, an actuator, and a resistor. The housing can define a receiving chamber and be coupled to the driving member. The rotating member can be rotatably mounted in the receiving chamber and coupled to the freewheel. The resistor can be received in the receiving chamber so as to be in slidable contact with the actuator. The resistor can be configured to be electrically coupled to a controlling module. The actuator can be made to slide by the rotating member along the resistor, thus adjusting a resistance value of the controlling module. The rotating member is capable of being rotated under an external force transmitted by the freewheel, thereby enabling the controlling module to generate a signal for controlling a torque output of the driving member.

Figure 2:
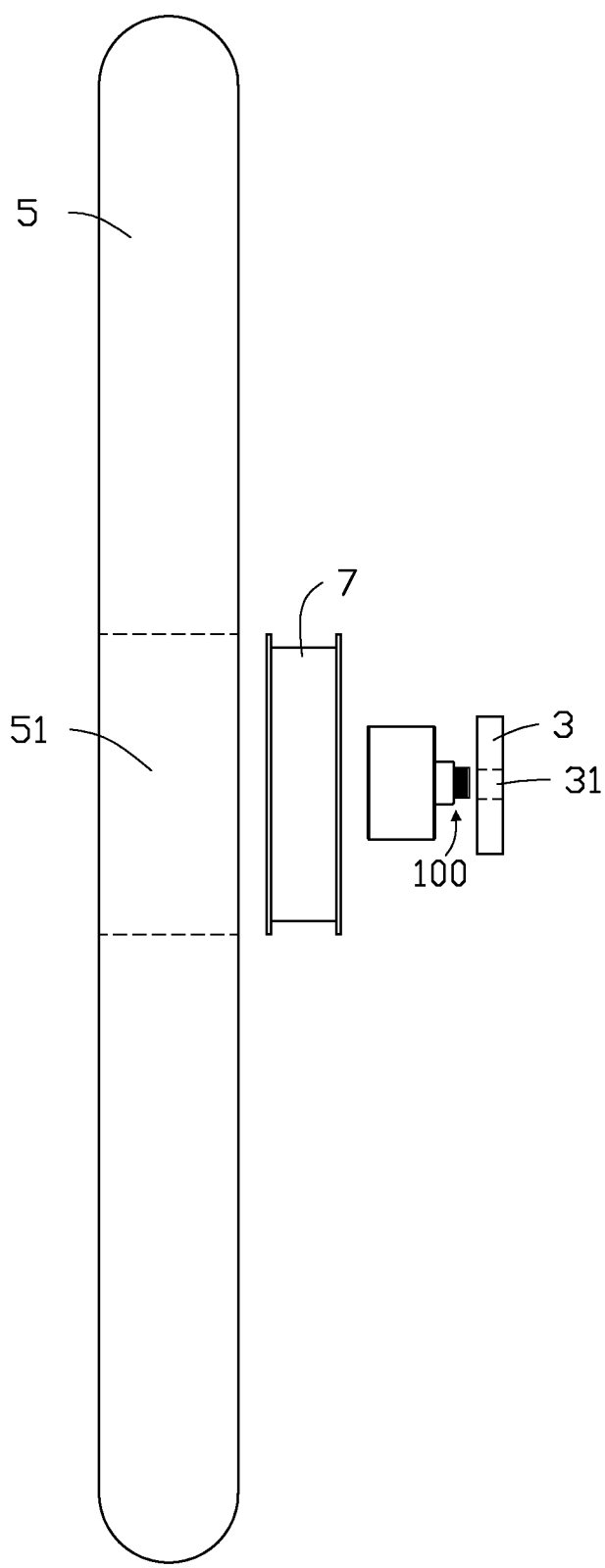
FIG. 2 is a partial exploded, diagrammatic view of the electric bicycle of FIG. 1, including a freewheel, a rear wheel, a driving member, and a torque sensor.
Figure 3:
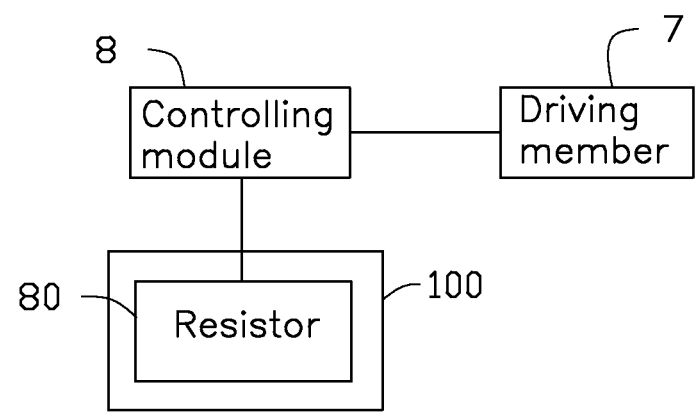
FIG. 3 is a block diagram view of a resistor and a controlling module in the driving member of FIG. 2.

FIGS. 1-2 illustrate an electric bicycle 1 which can include a freewheel 3, a rear wheel 5, a driving member 7, a controlling module 8, and a torque sensor 100. The freewheel 3 can define a central hole 31 thereon. The rear wheel 5 can define a larger central hole 51 thereon. The driving member 7 can be mounted in the central hole 51. The torque sensor 100 can be coupled between the freewheel 3 and the driving member 7. Referring to FIG. 3, both the torque sensor 100 and the driving member 7 can be electrically coupled to the controlling module 8. The freewheel 3 can drive the rear wheel 5 to rotate via the torque sensor 100, thereby allowing the torque sensor 100 to detect the torque transmitted by the freewheel 3. The controlling module 8 can be configured to control the driving member 7 to output an assisting power based on an amount of the torque detected by the torque sensor 100. Other components and configurations of the electric bicycle 1, such as front wheel, pedal, crank, are not described here.

Figure 4:
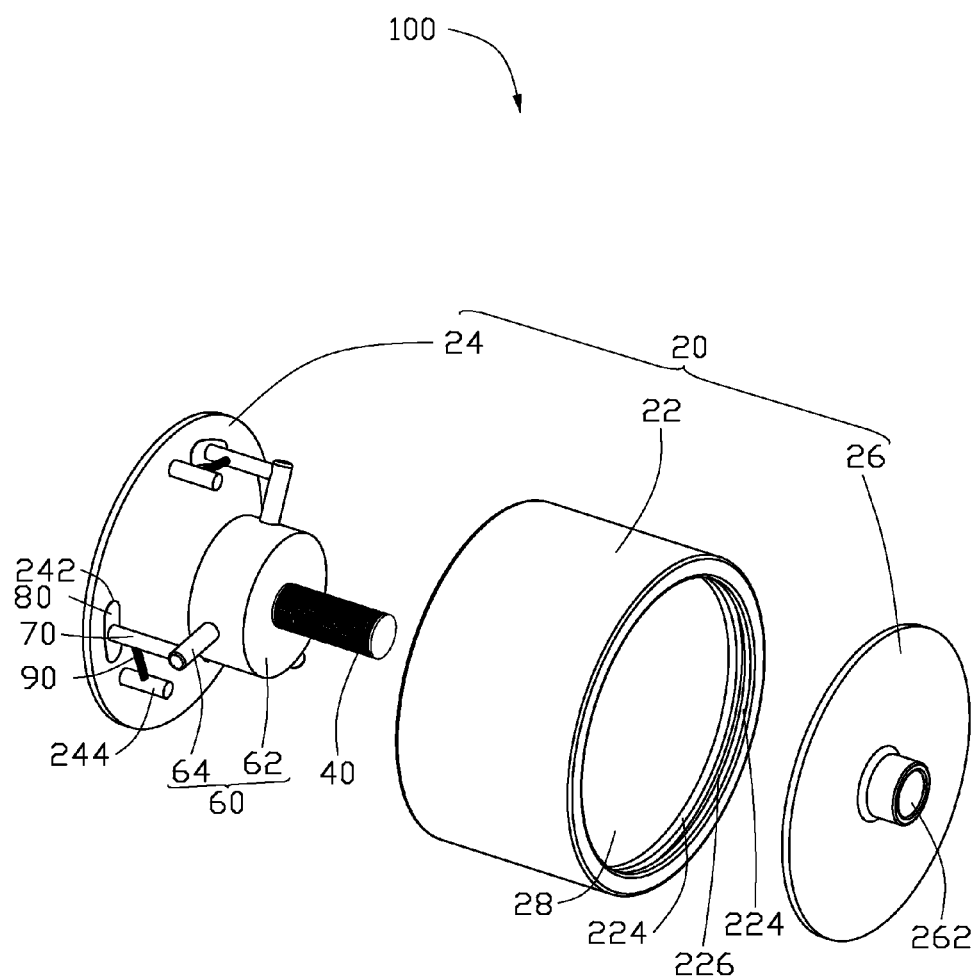
FIG. 4 is an exploded, isometric view of the torque sensor of FIG. 2.

Referring to FIG. 2, the torque sensor 100 can be mounted between the driving member 7 and the freewheel 3. The driving member 7, the torque sensor 100, and the freewheel 3 can be positioned coaxially in that order. FIG. 4 illustrates that the torque sensor 100 can include a housing 20, a transferring rod 40, a rotating member 60, an actuator 70, and a resistor 80. One end of the transferring rod 40 can be fixed to the central hole 31 of the freewheel 3, the other end of the transferring rod 40 can pass through the housing 20 and be fixed to the rotating member 60. The rotating member 60 can be rotatably mounted in the housing 20. The actuator 70 can be mounted in the housing 20 and coupled to the rotating member 60. The resistor 80 can be mounted in the housing 20 and electrically coupled to the controlling module 8. The resistor 80 is slidable in contact with the actuator 70. When the rotating member 60 rotates with the transferring rod 40 and the freewheel 3, the actuator 70 slides along the resistor 80, thus enabling the controlling module 8 to output an electric signal for controlling an amount of the torque outputted by the driving member 7.

The housing 20 can be a substantially hollow cylinder, which can include a base portion 22, a bottom cover 24, and a top cover 26. The bottom cover 24 and the top cover 26 can be respectively mounted on opposite ends of the base portion 22. The top cover 26 can be positioned adjacent to the freewheel 3, and the bottom cover 24 can be coupled to the side of the driving member 7 facing the freewheel 3. The base portion 22, the bottom cover 24, and a top cover 26 can cooperatively define a receiving chamber 28. In the embodiment, each end portion of the base portion 22 can include two projections 224 protruding around from an inner surface of the base portion 22. A mounting groove 226 can be defined between the two projections 224. Peripheries of the bottom cover 24 and the top cover 26 can be rotatably received in the mounting groove 226. The center of the top cover 26 can define a through inserting hole 262.

The transferring rod 40 can pass through the inserting hole 262 and can be fixed to the rotating member 60 coaxially. The rotating member 60 can be received and mounted in the receiving chamber 28. The rotating member 60 can be coupled to the transferring rod 40 coaxially, thereby rotating the rotating member 60 with the transferring rod 40. In the embodiment, the rotating member 60 can include a rotating shaft 62 and three connecting rods 64. The rotating shaft 62 can be fixed to an end of the transferring rod 40 away from the freewheel 3. The three connecting rods 64 can be separately mounted around a periphery of the rotating shaft 62. The three connecting rods 64 can extend radially away from the rotating shaft 62. In the illustrated embodiment, the torque sensor 100 can include three actuators 70 corresponding to the three connecting rods 64. Each actuator 70 can be coupled to a connecting rod 64 and spaced from the rotating shaft 62. Each actuator 70 can extend towards the bottom cover 24.

The resistor 80 can be received in the receiving chamber 28. In the embodiment, the torque sensor 100 can include three resistors 80 corresponding to the three actuators 70. Each resistor 80 can be separately mounted on the bottom cover 24 and be in slidable contact with an actuator 70. In the embodiment, an inner surface of the bottom cover 24 can separately define three sliding grooves 242. Each resistor 80 can be mounted in a sliding groove 242. One end of the actuator 70, away from the connecting rod 64, can slide along the resistor 80 in the sliding groove 242.

The torque sensor 100 can further include three elastic members 90. In the embodiment, the three fixing members 244 can extend from the inner surface of the bottom cover 24. Each fixing member 244 can be positioned adjacent to an end of the sliding groove 242. The elastic member 90 can be a spring. Opposite ends of the elastic member 90 can abut a fixing member 244 and an actuator 70.

In assembly, the bottom cover 24 can be rotatably mounted at an end of the base portion 22 via the mounting groove 226. The transferring rod 40 can be fixed to the rotating member 60. The rotating member 60 can be rotatably positioned in the receiving chamber 28. Each resistor 80 can be mounted in a sliding groove 242. The actuator 70 can be mounted at an end of the connecting rod 64 away from the rotating shaft 62. Each actuator 70 can be placed so as to be in slidable contact with a resistor 80. Each elastic member 90 can be placed between a fixing member 244 and an actuator 70. The top cover 26 can be sleeved on the transferring rod 40 and mounted on an end of the base portion 22 away from the bottom cover 24. The bottom cover 24 can be mounted on the side of the driving member 7 facing the freewheel 3. The transferring rod 40 can be inserted into the central hole 31 of the freewheel 3.

When a pedaling rider pushes pedals to rotate the freewheel 3, the freewheel 3 drives the transferring rod 40 and the rotating member 60 to rotate through a certain angle. The rotating member 60 moves the actuator 70 to slide a certain distance along the resistor 80. The elastic member 90 becomes compressed. A resistance value of the controlling module 8 as the actuator 70 slides along the resistor 80 can be adjusted, to allow the controlling module 8 to output a calibrated signal. The driving member 7 can output a certain power according to the signal, to assist the pedaling rider. When the freewheel 3 is not being rotated, the elastic member 90 under compression can reset the actuator 70 and the rotating member 60, the driving member 7 does not then output any assisting power.

In other embodiments, the torque sensor 100 can be applied to any type of vehicle that is manually powered but which can benefit from a power assist. In other embodiments, the number of actuators 70 and resistors 80 can be one or two or more than three. The rotating shaft 62 can be slidably mounted on the bottom cover 24 and the transferring rod 40 can be omitted. The fixing member 244 can be integrally formed or detachably mounted on the bottom cover 24. The controlling module 8 can be positioned in or out of the housing 20.

The embodiments shown and described above are only examples. Many details are often found in the art such as the other features of a torque sensor and an electric bicycle using the torque sensor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A torque sensor comprising:
    a housing having a receiving chamber and configured to be coupled to a driving member;
    a rotating member rotatably mounted in the receiving chamber;
    an actuator received in the receiving chamber and coupled to the rotating member;
    a resistor received in the receiving chamber and be in slidable contact with the actuator the resistor configured to be electrically coupled to a controlling module;
    wherein the actuator is made to slide by the rotating member along the resistor for adjusting a resistance value of the controlling module, the rotating member is capable of being rotated under an external force, thereby enabling the controlling module to generate a signal for controlling a torque output of the driving member.

2. The torque sensor of claim 1, wherein the torque sensor comprises a plurality of actuators and a plurality of resistors, the plurality of resistors are separately mounted on the housing, the plurality of actuators are separately mounted on the rotating member, and each actuator is in slidable contact with one of the plurality of resistors.

3. The torque sensor of claim 2, wherein the rotating member comprises a rotating shaft and a plurality of connecting rods, the rotating shaft is configured to be rotated by the external force, the plurality of connecting rods are separately mounted around the rotating shaft, and each actuator is coupled to one of the plurality of connecting rods and spaced from the rotating shaft.

4. The torque sensor of claim 1, wherein the torque sensor comprises an elastic member and a fixing member received in the receiving chamber, the fixing member is positioned adjacent to the resistor, and the elastic member is coupled between the fixing member and the actuator.

5. The torque sensor of claim 1, wherein the torque sensor further comprises a transferring rod, the transferring rod passes through the housing, and is fixed to the rotating member coaxially.

6. The torque sensor of claim 1, wherein the housing comprises a base portion, a bottom cover and a top cover, the bottom cover and the top cover are respectively mounted on two opposite ends of the base portion, the receiving chamber is cooperatively defined by the base portion, the bottom cover and the top cover, the resistor is mounted on an inner surface of the bottom cover.

7. The torque sensor of claim 6, wherein each end of the base portion comprises two projections protruding around from an inner surface of the base portion, a mounting groove is defined between the two projections, peripheries of the bottom cover and the top cover are rotatably received in the mounting groove.

8. The torque sensor of claim 6, wherein the inner surface of the bottom cover defines a sliding groove, the resistor is mounted in the sliding groove.

9. An electric bicycle comprising:
a freewheel;
a rear wheel having a central hole;
a driving member mounted in the central hole of the rear wheel;
a controlling module electrically coupled to the driving member;
a torque sensor coupled between the driving member and the freewheel comprising:
   a housing having a receiving chamber couple to the driving member;
   a rotating member rotatably mounted in the receiving chamber and coupled to the freewheel;
   an actuator received in the receiving chamber and coupled to the rotating member;
   a resistor received in the receiving chamber and be in slidable contact with the actuator, the resistor configured to be electrically coupled to a controlling module;
   wherein the actuator is made to slide by the rotating member along the resistor for adjusting a resistance value of the controlling module, the rotating member is capable of being rotated under an external force transmitted by the freewheel, thereby enabling the controlling module to generate a signal for controlling a torque output of the driving member.

10. The electric bicycle of claim 9, wherein the torque sensor comprises a plurality of actuators and a plurality of resistors, the plurality of resistors are separately mounted on the housing, the plurality of actuators are separately mounted on the rotating member, and each actuator is in slidable contact with one of the plurality of resistors.

11. The electric bicycle of claim 10, wherein the rotating member comprises a rotating shaft and a plurality of connecting rods, the rotating shaft is coupled to the freewheel, the plurality of connecting rods are separately mounted around the rotating shaft, each actuator is coupled to one of the plurality of connecting rods and spaced from the rotating shaft.

12. The electric bicycle of claim 9, wherein the torque sensor comprises an elastic member and a fixing member received in the receiving chamber, the fixing member is positioned adjacent to the resistor, and the elastic member is coupled between the fixing member and the actuator.

13. The electric bicycle of claim 9, wherein the torque sensor further comprises a transferring rod, the transferring rod passes through the housing, and is fixed to the rotating member coaxially.

14. The electric bicycle of claim 9, wherein the housing comprises a base portion, a bottom cover and a top cover, the bottom cover and the top cover are respectively mounted on two opposite ends of the base portion, the receiving chamber is cooperatively defined by the base portion, the bottom cover and the top cover, and the resistor is mounted on an inner surface of the bottom cover.

15. The electric bicycle of claim 14, wherein each end of the base portion comprises two projections protruding around from an inner surface of the base portion, a mounting groove is defined between the two projections, peripheries of the bottom cover and the top cover are rotatably received in the mounting groove.

16. The electric bicycle of claim 14, wherein the inner surface of the bottom cover defines a sliding groove, the resistor is mounted in the sliding groove.

* * * * *